United States Patent
Iwazaki et al.

(10) Patent No.: US 7,389,167 B2
(45) Date of Patent: Jun. 17, 2008

(54) DRIVING SUPPORT SYSTEM AND METHOD

(75) Inventors: Katsuhiko Iwazaki, Numazu (JP); Seiji Kawakami, Susono (JP); Satoru Niwa, Susono (JP); Hiroaki Kataoka, Susono (JP); Chumsamutr Rattapon, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 548 days.

(21) Appl. No.: 11/134,301

(22) Filed: May 23, 2005

(65) Prior Publication Data

US 2005/0278096 A1  Dec. 15, 2005

(30) Foreign Application Priority Data

May 31, 2004  (JP)  ............................. 2004-162166

(51) Int. Cl.
  *A01B 69/00*  (2006.01)
(52) U.S. Cl. ......................... 701/41; 701/42; 180/168; 340/439
(58) Field of Classification Search .................. 701/41, 701/42; 180/167, 168, 169; 340/435, 439, 340/438; 348/119
  See application file for complete search history.

(56) References Cited

U.S. PATENT DOCUMENTS

| 5,765,116 | A | | 6/1998 | Wilson-Jones et al. |
| 6,050,359 | A | | 4/2000 | Mouri et al. |
| 6,070,112 | A | * | 5/2000 | Sato et al. ...................... 701/41 |
| 6,092,619 | A | * | 7/2000 | Nishikawa et al. .......... 180/446 |
| 6,198,992 | B1 | * | 3/2001 | Winslow ...................... 701/23 |
| 6,308,123 | B1 | | 10/2001 | Ikegaya et al. |
| 6,542,800 | B2 | | 4/2003 | Kawazoe et al. |

FOREIGN PATENT DOCUMENTS

| EP | 1 170 195 A2 | 1/2002 |
| EP | 1 170 651 A2 | 1/2002 |
| EP | 1 184 254 A2 | 3/2002 |
| JP | A 2001-010518 | 1/2001 |
| JP | A-2002-19632 | 1/2002 |

\* cited by examiner

*Primary Examiner*—Richard M. Camby
(74) *Attorney, Agent, or Firm*—Oliff & Berridge, PLC

(57) ABSTRACT

A driving support system according to the present invention is provided with an actuator for steering steered wheels of a vehicle and is used for supporting driving of the vehicle by making use of steering by means of the actuator. The driving support system has an image taking device for taking a forward image ahead the vehicle, a determiner for determining a controlled variable of the actuator on the basis of the forward image acquired by the image taking device, a limiter for limiting the controlled variable when a time change of the controlled variable of the actuator determined by the determiner is off a predetermined range, and a controller for controlling the actuator. The limiter sets a limit value for limiting the time change of the controlled variable of the actuator so that the limit value at a start (or at an end) of the driving support control is different from the limit value in continuation of the driving support control. In this configuration, the limit value to prevent a driver from sensing discomfort is set at the start (or at the end) of the driving support control, while the limit value suitable for the driving support control is set during continuous execution of the driving support control. This permits the system to achieve suppression of the discomfort at the start (or at the end) of the support control and improvement in performance of the support control in continuation of the control together.

24 Claims, 3 Drawing Sheets

DRIVING SUPPORT SYSTEM AND METHOD

BACKGROUND OF THE INVENTION

1. Field of the Invention

The present invention relates to a driving support system and method with an actuator for steering steered wheels of a vehicle, which supports driving of the vehicle by means of the actuator.

2. Related Background of the Invention

There are known driving support systems (methods) arranged to take a forward image ahead a vehicle with a camera or the like, to detect a driving route of the vehicle on the basis of the taken image or video, and to support driving so as to prevent the vehicle from departing from the driving route, and they started to be mounted on commercially available cars. Such driving support systems are called lane keep (assist) systems or the like, and include those for simply drawing driver's attention in the event of a departure from the driving route, and those for actuating an actuator to steer the steered wheels in the event of a departure from the driving route (or assist steering), and thereby correct the departure from the driving route. An example of the latter is the one described in Japanese Patent Application Laid-Open No. 2001-10518.

SUMMARY OF THE INVENTION

In the case of the aforementioned driving support systems (methods) for correcting the departure from the driving route, the support control is once suspended with intervention of a driver or upon a failure in the detection of the forward route due to various conditions. For this reason, the driving support control repeats stops and starts. In the conventional driving support systems, the steering reaction to steering of the steered wheels suddenly varies at the start or at the stop (end) of the driving support control, to cause the driver to sense significant discomfort. Therefore, an object of the present invention is to provide a driving support system capable of achieving a driving support control with little discomfort.

A driving support system according to the present invention is an apparatus with an actuator for steering a steered wheel of a vehicle, which performs a driving support control for supporting driving of the vehicle by making use of steering by means of the actuator, the driving support system comprising: image taking means for taking a forward image ahead the vehicle; determining means for determining a controlled variable of the actuator on the basis of the forward image acquired by the image taking means; limiting means for limiting the controlled variable when a time change of the controlled variable of the actuator determined by the determining means is off a predetermined range; and controlling means for controlling the actuator, wherein the limiting means sets a limit value for limiting the time change of the controlled variable of the actuator so that the limit value at a start of the driving support control is different from the limit value in continuation of the driving support control.

The driving support system of the present invention limits the controlled variable when the time change of the controlled variable of the actuator is off the predetermined range, and this limit value at the start of the driving support control is different from that in continuation of the driving support control. In this configuration, the limit value to prevent the driver from sensing discomfort at the start of the driving support control is set at the start of the driving support control, while the limit value suitable for the driving support control is set in continuation of the driving support control after the start, whereby the system is able to achieve both suppression of the discomfort at the start of the support control and improvement in the performance of the support control in continuation. The time change of the controlled variable is one indicating how much a variation of the reaction of the steering system is upon actuation of the actuator by the support control, e.g., a time change rate or a time change amount.

Preferably, the limiting means sets the limit value so that an absolute value of the limit value at the start of the driving support control is smaller than an absolute value of the limit value in continuation of the driving support control. When the absolute value of the limit value at the start of the driving support control is smaller than the absolute value of the limit value in continuation of the driving support control, the driver's discomfort due to the reaction of the steering system can be effectively suppressed at the start of the driving support control.

Furthermore, preferably, the limiting means sets the limit value so that the limit value at an end of the driving support control is also different from the limit value in continuation of the driving support control. In addition to the limit value at the start of the driving support control, the limit value at the end of the driving support control is also made different from the limit value in continuation of the driving support control. In this configuration, the limit value to prevent the driver from sensing discomfort can be set not only at the start of the driving support control but also at the end of the driving support control, while the limit value suitable for the driving support control can be set in continuation of the driving support control. In consequence, it is feasible to achieve both the suppression of the discomfort at the start and at the end of the support control and the improvement in the performance of the support control in continuation.

In this case, preferably, the limiting means sets the limit value so that an absolute value of the limit value at the end of the driving support control is smaller than the absolute value of the limit value in continuation of the driving support control. In the same manner as at the start of the driving support control, the absolute value of the limit value at the end of the driving support control is made smaller than the absolute value of the limit value in continuation of the driving support control, whereby the driver's discomfort due to the reaction of the steering system can be effectively suppressed at the end of the driving support control. It is noted that the absolute value of the limit value at the start of the driving support control does not have to be identical with the absolute value of the limit value at the end of the driving support control.

Another driving support system according to the present invention is an apparatus with an actuator for steering a steered wheel of a vehicle, which performs a driving support control for supporting driving of the vehicle by making use of steering by means of the actuator, the driving support system comprising: image taking means for taking a forward image ahead the vehicle; determining means for determining a controlled variable of the actuator on the basis of the forward image acquired by the image taking means; limiting means for limiting the controlled variable when a time change of the controlled variable of the actuator determined by the determining means is off a predetermined range; and controlling means for controlling the actuator, wherein the limiting means sets a limit value for limiting the time change of the controlled variable of the actuator so that the limit value at an end of the driving support control is different from the limit value in continuation of the driving support control.

The driving support system of the present invention limits the controlled variable when the time change of the controlled variable of the actuator is off the predetermined range, and the limit value at the end of the driving support control is different from that in continuation of the driving support control. In this configuration, the limit value to prevent the driver from sensing discomfort at the stop of the driving support control is set at the end of the driving support control, while the limit value suitable for the driving support control is set in continuation of the driving support control before the stop, whereby the system is able to achieve both the suppression of the discomfort at the end of the support control and the improvement in the performance of the support control in continuation.

Preferably, the limiting means sets the limit value so that an absolute value of the limit value at the end of the driving support control is smaller than an absolute value of the limit value in continuation of the driving support control. When the absolute value of the limit value at the end of the driving support control is made smaller than the absolute value of the limit value in continuation of the driving support control, the driver's discomfort due to the reaction of the steering system can be effectively suppressed at the stop of the driving support control.

A driving support method for steering a steered wheel of a vehicle by means of an actuator, which performs a driving support control, wherein a forward image ahead the vehicle is taken; a controlled variable of the actuator is determined on the basis of the forward image acquired; and the actuator is controlled with a limitation of the controlled variable when a time change of the controlled variable of the actuator determined is off a predetermined range, wherein a limit value is set for limiting the time change of the controlled variable of the actuator so that the limit value at a start of the driving support control is different from the limit value in continuation of the driving support control.

The driving support method of the present invention limits the controlled variable when the time change of the controlled variable of the actuator is off the predetermined range, and this limit value at the start of the driving support control is different from that in continuation of the driving support control. In this configuration, the limit value to prevent the driver from sensing discomfort at the start of the driving support control is set at the start of the driving support control, while the limit value suitable for the driving support control is set in continuation of the driving support control after the start, whereby the system is able to achieve both suppression of the discomfort at the start of the support control and improvement in the performance of the support control in continuation. The time change of the controlled variable is one indicating how much a variation of the reaction of the steering system is upon actuation of the actuator by the support control, e.g., a time change rate or a time change amount.

Preferably, the limit value is set so that an absolute value of the limit value at the start of the driving support control is smaller than an absolute value of the limit value in continuation of the driving support control. When the absolute value of the limit value at the start of the driving support control is smaller than the absolute value of the limit value in continuation of the driving support control, the driver's discomfort due to the reaction of the steering system can be effectively suppressed at the start of the driving support control.

Furthermore, preferably, the limit value is set so that the limit value at an end of the driving support control is also different from the limit value in continuation of the driving support control. In addition to the limit value at the start of the driving support control, the limit value at the end of the driving support control is also made different from the limit value in continuation of the driving support control. In this configuration, the limit value to prevent the driver from sensing discomfort can be set not only at the start of the driving support control but also at the end of the driving support control, while the limit value suitable for the driving support control can be set in continuation of the driving support control. In consequence, it is feasible to achieve both the suppression of the discomfort at the start and at the end of the support control and the improvement in the performance of the support control in continuation.

In this case, preferably, the limit value is set so that an absolute value of the limit value at the end of the driving support control is smaller than the absolute value of the limit value in continuation of the driving support control. In the same manner as at the start of the driving support control, the absolute value of the limit value at the end of the driving support control is made smaller than the absolute value of the limit value in continuation of the driving support control, whereby the driver's discomfort due to the reaction of the steering system can be effectively suppressed at the end of the driving support control. It is noted that the absolute value of the limit value at the start of the driving support control does not have to be identical with the absolute value of the limit value at the end of the driving support control.

Another driving support method according to the present invention is a driving support method for steering a steered wheel of a vehicle by means of an actuator, which performs a driving support control, wherein a forward image ahead the vehicle is taken; a controlled variable of the actuator is determined on the basis of the forward image acquired; and the actuator is controlled with a limitation of the controlled variable when a time change of the controlled variable of the actuator determined is off a predetermined range, wherein a limit value is set for limiting the time change of the controlled variable of the actuator so that the limit value at an end of the driving support control is different from the limit value in continuation of the driving support control.

The driving support method of the present invention limits the controlled variable when the time change of the controlled variable of the actuator is off the predetermined range, and the limit value at the end of the driving support control is different from that in continuation of the driving support control. In this configuration, the limit value to prevent the driver from sensing discomfort at the stop of the driving support control is set at the end of the driving support control, while the limit value suitable for the driving support control is set in continuation of the driving support control before the stop, whereby the system is able to achieve both the suppression of the discomfort at the end of the support control and the improvement in the performance of the support control in continuation.

Preferably, the limit value is set so that an absolute value of the limit value at the end of the driving support control is smaller than an absolute value of the limit value in continuation of the driving support control. When the absolute value of the limit value at the end of the driving support control is made smaller than the absolute value of the limit value in continuation of the driving support control, the driver's discomfort due to the reaction of the steering system can be effectively suppressed at the stop of the driving support control.

DESCRIPTION OF THE PREFERRED EMBODIMENTS

Figure 1:
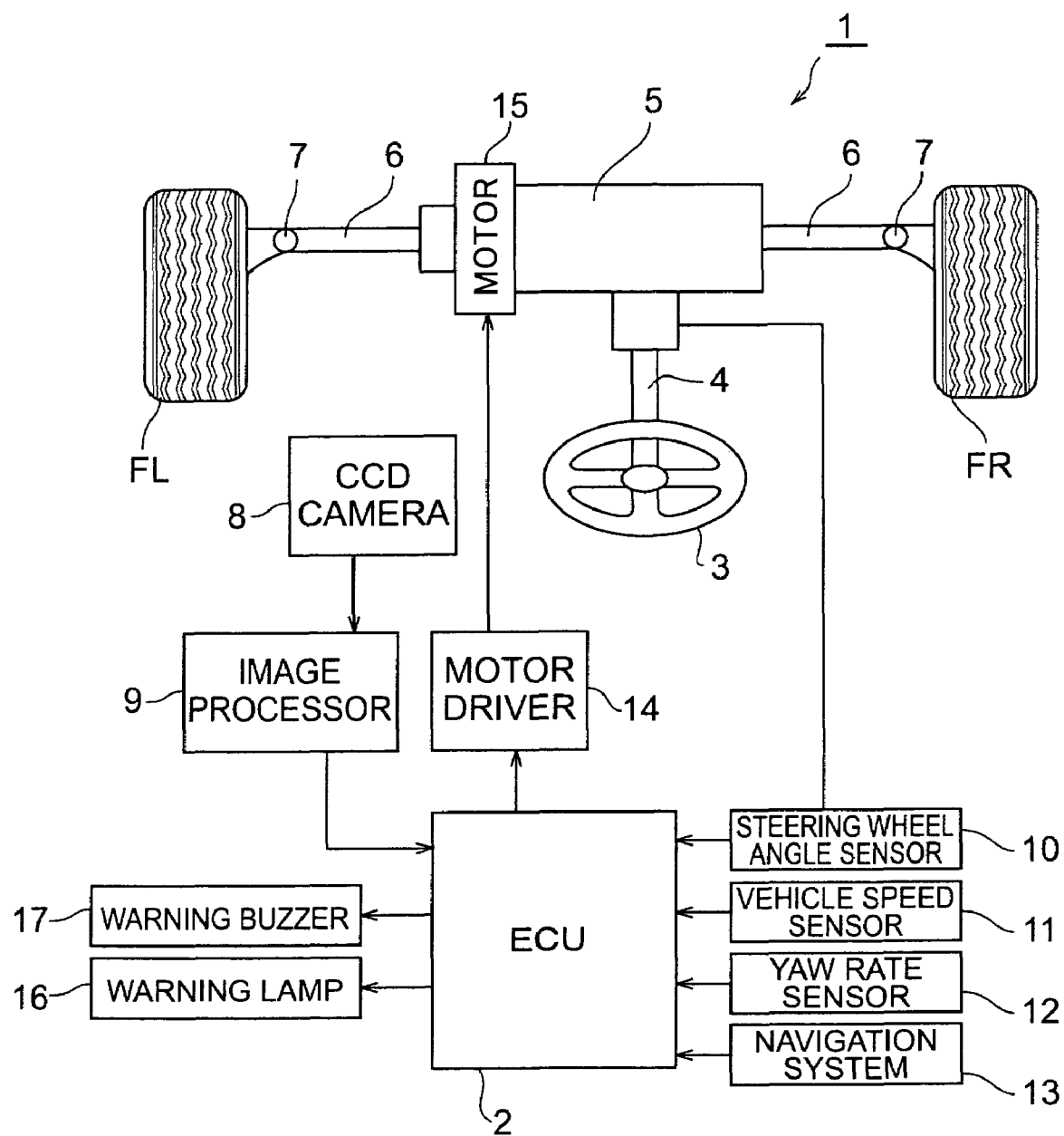
FIG. 1 is a configuration diagram of a vehicle with an embodiment of the driving support system of the present invention.

An embodiment of the driving support system according to the present invention will be described below. FIG. 1 shows a configuration diagram of vehicle 1 provided with the driving support system of the present embodiment. The vehicle 1 has an electronic control unit (ECU) 2, and ECU 2 controls a driving support (lane keep control). As shown in FIG. 1, the vehicle 1 has a steering wheel 3. The steering wheel 3 is installed in an interior of the vehicle 1, and, when the driver manipulates the steering wheel, it results in steering steered wheels (front right and left road wheels FR, FL herein). The steering wheel 3 is fixed to one end of steering shaft 4. The steering shaft 4 rotates in conjunction with rotation of the steering wheel 3.

A rack bar 6 is coupled through steering gear box 5 to the other end of the steering shaft 4. The steering gear box 5 has a function of transforming a rotational motion of the steering shaft 4 to a translational motion of the rack bar 6 along its axial direction. The both ends of rack bar 6 are coupled through a knuckle arm 7 to respective hub carriers of the wheels FL, FR. In this configuration, with rotation of the steering wheel 3, the wheels FL, FR are steered through the steering shaft 4 and steering gear box 5 (rack bar 6).

A CCD camera 8 for taking a forward image is incorporated in an interior mirror. The CCD camera 8 images surrounding circumstances in a predetermined region ahead the vehicle 1. An image processor 9 is connected to the CCD camera 8. Image data of surrounding circumstances taken by the CCD camera 8 is supplied to the image processor 9. The image processor 9 subjects the image data taken by the CCD camera 8, to image processing, and detects a lane (driving route) on the basis of white lines or the like drawn on a road on which the vehicle 1 is running. In the taken image or video the luminance difference is large between the road surface and white lines drawn thereon, and it is thus relatively easy to detect the white lines, which is convenient in detecting the lane ahead the vehicle.

The image processor 9 is connected to the aforementioned ECU 2. The image processor 9 detects a curvature (1/R) of a curve of the forward driving route, an offset D of vehicle 1 relative to the lane, and a yaw angle θ by arithmetic operation, based on the detected lane, and sends the result to ECU 2. Methods of detecting the various information contents (the curve curvature (1/R) and the offset D and yaw angle θ of the host vehicle) about the forward driving route on the basis of the image can be selected from the well-known methods.

The offset D is also called a lateral deviation amount or the like, and is a value indicating a lateral deviation (offset) of the vehicle relative to the driving route. The offset D is determined based on appropriate measures, such as the center line, and the center line of the driving lane. The yaw angle θ is also called an angle of deflection, and is a value indicating a traveling direction of the vehicle relative to the driving route. In the present embodiment the CCD camera 8 functions as an image taking means and the image processor 9 as a detecting means. Another potential configuration is such that the image processor 9 performs processing of the image to a certain degree and thereafter sends it to ECU 2, and the ECU 2 performs the arithmetic operation to obtain the curvature (1/R), offset D, and yaw angle θ. In this case, ECU 2 functions as a detecting means.

Steering wheel angle sensor 10 and vehicle speed sensor 11 are also connected to the ECU 2. The steering wheel angle sensor 10 outputs a signal according to a steering wheel angle of the steering wheel 3. It is also possible to provide a steering wheel torque sensor or the like instead of (or in addition to) the steering wheel angle sensor 10 and to detect a steering state of the steering wheel 3 on the basis thereof. The vehicle speed sensor 11 consists of wheel speed sensors mounted on the respective wheels and generates pulse signals in a period according to a speed of the vehicle 1. The vehicle speed sensor 11 functions as a vehicle speed detecting means. It is also possible to mount a sensor for detecting a longitudinal acceleration of the vehicle, as a vehicle speed detecting means and to obtain the vehicle speed by integrating the output from the sensor over time. The output signal from the steering wheel angle sensor 10 and the output signal from the vehicle speed sensor 11 are supplied each to ECU 2. ECU 2 detects the steer angle on the basis of the output signal from the steering wheel angle sensor 10 and detects the vehicle speed on the basis of the output signal from the vehicle speed sensor 11.

In addition, a yaw rate sensor 12 and a navigation system 13 are also connected to ECU 2. The yaw rate sensor 12 is placed near the center of gravity of the vehicle 1 and is configured to detect the yaw rate around the vertical axis at the center of gravity and send the detection result to ECU 2. The navigation system 13 is a device for detecting the position of the vehicle 1 by use of GPS or the like. The navigation system 13 also has a function of detecting circumstances such as the curvature (1/R) of a curve, the gradient, etc. ahead the vehicle 1. ECU 2 grasps the position of the vehicle 1 and the circumstances of the road anticipated during driving, by means of the navigation system 13.

Furthermore, a motor driver 14 is also connected to ECU 2. A motor (actuator) 15 disposed on the aforementioned steering gear box 5 is connected to the motor driver 14. Although not illustrated, a ball screw groove is formed in a partial region of the outer peripheral surface of the rack bar 6, and a ball nut having a ball screw groove corresponding to the ball screw groove of the rack bar, on its inner peripheral surface is fixed to a rotor of the motor 15. A plurality of bearing balls are set between the pair of ball screw grooves, and with actuation of the motor 15 the rotor rotates to assist axial movement of the rack bar 6, i.e., steering.

The motor driver 14 supplies a drive current to motor 15 in accordance with a command signal from ECU 2. The motor 15 applies a steering torque according to the drive current supplied from the motor driver 14, to the rack bar 6. ECU 2 supplies a command signal to motor driver 14 in accordance with a logic described later, to drive the motor 15 and thereby displace the rack bar 6, so as to steer the wheels FL, FR.

A warning lamp 16 and a warning buzzer 17 are connected to ECU 2. The warning lamp 16 is located at a position where the occupant in the interior can visually recognize the lamp, and lights Up according to a command signal from ECU 2. The warning buzzer 17 emits a sound to the interior according to a command signal from ECU 2. ECU 2 actuates the warning lamp 16 and warning buzzer 17 according to a logic described later, to draw occupant's attention.

The lane keep control (driving support control) will be briefly described. First, CCD camera 8 acquires a forward image ahead the vehicle 1, and the curve curvature (1/R), offset D, and yaw angle θ are detected from the image. The offset D is also called a lateral deviation amount or the like and is a value indicating a lateral deviation (offset) of the vehicle relative to the driving route. The offset D is determined based on appropriate measures such as the center line, and the center line of the driving lane. The yaw angle θ is also called an angle of deflection and is a value indicating the traveling direction of the vehicle relative to the driving route.

A yaw rate $\omega_r$ necessary for the vehicle 1 to travel along the curve is determined based on the curvature (1/R) of the curve ahead the vehicle 1. The ECU also acquires a yaw rate $\omega_d$ necessary for adjusting the current offset D of the host vehicle 1 to a target offset $D_0$. Similarly, the ECU acquires a yaw rate $\omega_\theta$ necessary for adjusting the current yaw angle θ of the host vehicle 1 to a target yaw angle $\theta_0$. Then the ECU obtains a target yaw rate ω by summing up these $\omega_r$, $\omega_d$, and $\omega_\theta$. When the target yaw rate ω is generated in the vehicle, the vehicle 1 can travel along the forward curve and the offset D and yaw angle θ thereof can converge to their respective target values.

A relation of G=Vω/g (g is the gravitational acceleration) holds between the yaw rate ω and the lateral acceleration G, and if the vehicle speed V is constant, the yaw rate ω and the lateral acceleration G are in one-to-one correspondence. The ECU calculates a steering torque for generating the determined yaw rate ω (or the lateral acceleration G corresponding thereto), i.e., a controlled variable of the motor 15, and the motor 15 is driven on the basis thereof. In consequence, the vehicle 1 is prevented from departing from the lane, and thus travels as keeping the lane.

In the lane keep control of the present embodiment, the time change of the controlled variable of the motor 15 is limited when the time change is off a predetermined range, in order to avoid sudden steering during the lane keep control. As described above, the support control is once suspended upon driver's intervention in steering during the lane keep control or upon a failure in detection of the forward route due to various conditions, and thus the driving support control repeats stops and starts. The time change of the controlled variable of motor 15 is limited to the upper limit, as described above, but a change of the reaction of steering occurs at starts and ends of the driving support control, i.e., the operation on the steering wheel 3 becomes suddenly light or heavy, so as to cause the driver to sense discomfort.

Figure 2:
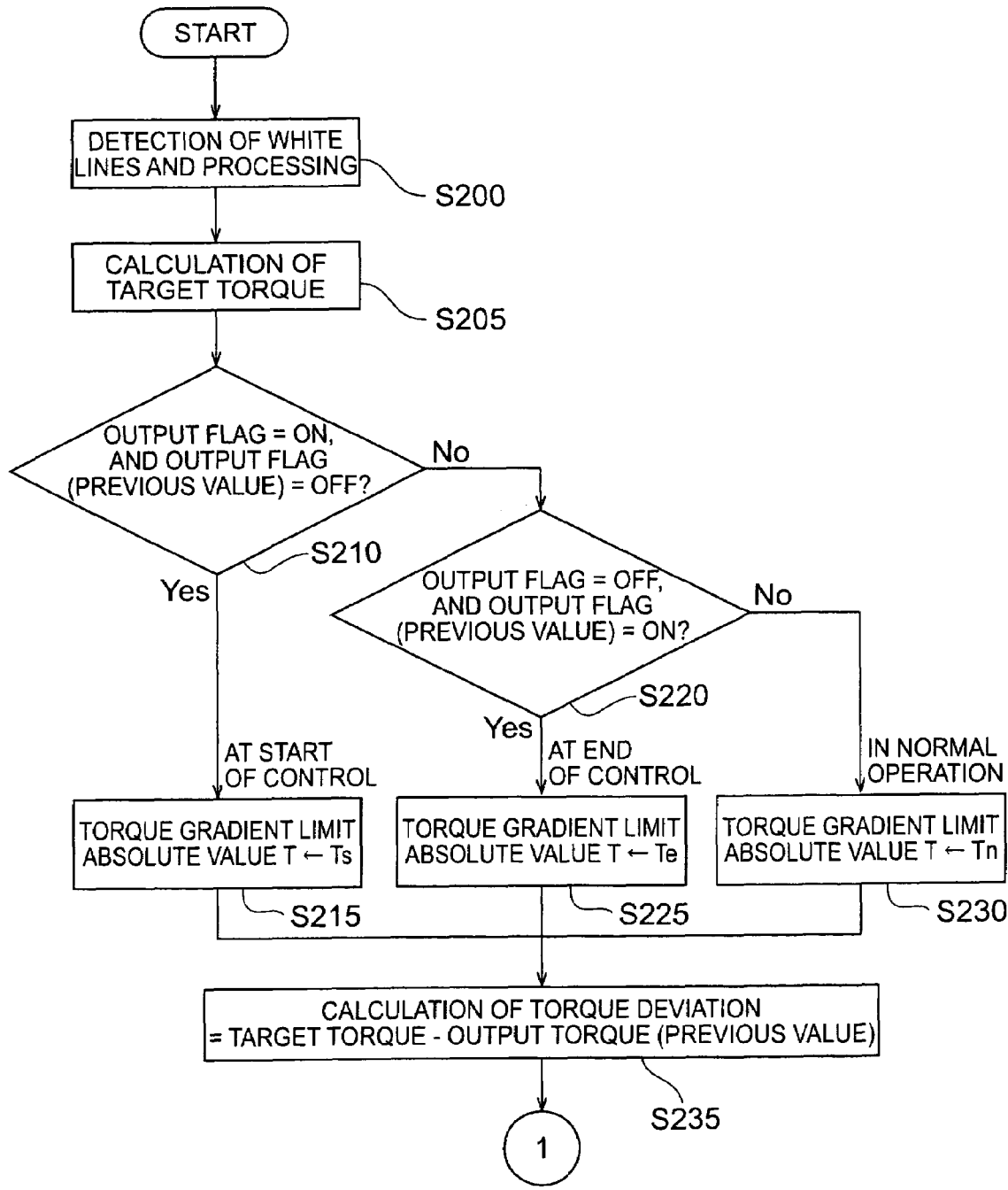
FIG. 2 is a flowchart (first half) of a driving support control (lane keep control) by an embodiment of the driving support system of the present invention.
Figure 3:
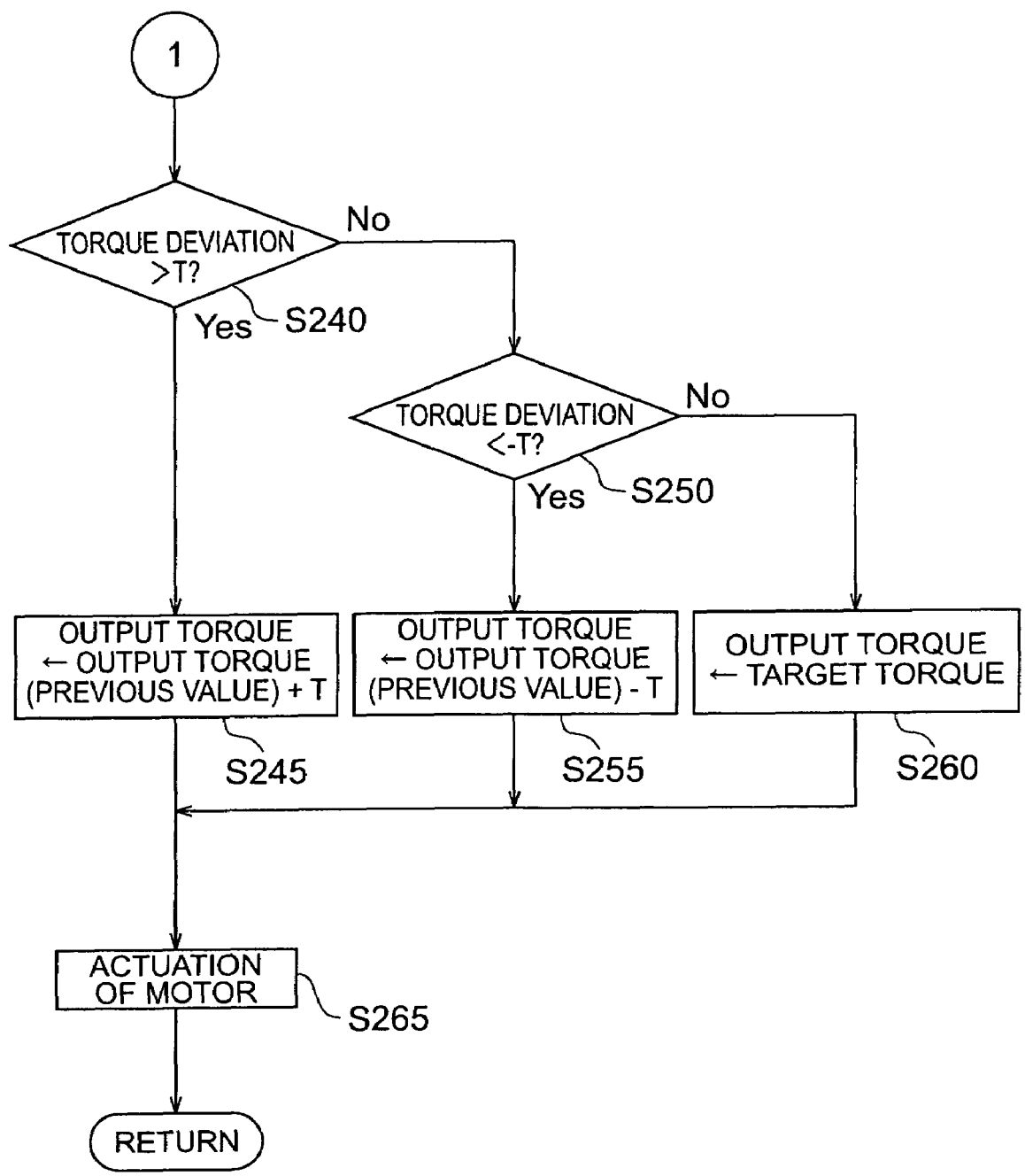
FIG. 3 is a flowchart (second half) of a driving support control (lane keep control) by an embodiment of the driving support system of the present invention.

In order to eliminate or reduce this discomfort, the present embodiment is arranged to set a limit value for limiting the time change of the controlled variable of motor 15 so that the limit value at a start and at an end of the driving support control is different from that in continuation of the driving support control. This will be specifically described below with reference to the flowchart shown in FIGS. 2 and 3.

First, the system detects white lines in image data taken by the CCD camera 8 and detects a forward route (lane) (step 200). Next, the control unit calculates a target steering torque (controlled variable of motor 15) for keeping the lane, based on the detected lane (step 205). This calculation of the target torque is conducted based on the curve curvature (1/R), offset D, and yaw angle θ, as described above. A method of calculating the controlled variable for lane keep, based on the forward driving route ahead the vehicle 1 can be selected from the well-known methods.

Then the control unit checks a state of an output flag indicating the state of the output of the motor 15, to determine whether the lane keep control is at a start, in continuation, or at an end. First, it is determined whether the conditions that the present value of the output flag is ON and that the previous value thereof is OFF are both satisfied (step 210). This output flag is a flag that is set to ON when the driving of the motor 15 is started for the lane keep control and when the driving is continued. The output flag is also a flag that is set to OFF when the driving of the motor 15 for the lane keep control is stopped and when the stop state is continued. When the output flag is set to ON, the driving of motor 15 is started (to go into a start transition state); when the output flag is set to OFF, the stop of motor 15 is effected (to go into an end transition state).

Namely, when step 210 results in answering yes, it can be determined that the lane keep control is in the start transition state. In this case, a limit value Ts for a start of control is set as a torque gradient limit absolute value T (step 215). The torque gradient limit absolute value T is the aforementioned limit value to limit the time change of the controlled variable of motor 15. On the other hand, when step 210 results in answering no (or when the present state is not the control start transition state), it is determined whether the conditions that the present value of the output flag is OFF and that the previous value thereof is ON are both satisfied (step 220). When step 220 results in answering yes, it can be determined that the lane keep control is in the end transition state. In this case, a limit value Te for an end of control is set as a torque gradient limit absolute value T (step 225).

When step 220 results in answering no, the present status is a state in which the driving of motor 15 is continued or a state in which the stop of the motor 15 is continued. In this case, a limit value Tn for normal operation is set as a torque gradient limit absolute value T (step 230). However, when the present status is the state in which the stop of motor 15 is continued, even if the limit value Tn for normal operation is set as the torque gradient limit absolute value T, this limit value will not be used, and it is merely set. This torque gradient limit absolute value T is an upper limit of a variation amount of the controlled variable of motor 15, i.e., a variable amount of steering torque permitted per unit time (one operation cycle herein). The reason why it is the absolute value is that a variation on the increasing side (positive side) of steering torque and a variation on the decreasing side (negative side) are defined as widths (positive values). In this example, Ts<Tn and Te<Tn.

After the torque gradient limit absolute value T is determined at one of steps 215, 225, and 230, the control unit calculates a deviation between the previous value and the present value of steering torque where the target steering torque calculated at step 205 is employed (step 235). If the absolute value of this deviation is large, the variation of steering torque is large, i.e., the variation of steering reaction is large, and it can be said that the driver is likely to sense discomfort. After the deviation is calculated at step 235, the control unit first determines whether this deviation is larger than the torque gradient limit absolute value T (step 240).

When step 240 results in answering yes, the deviation is greater than the set torque gradient limit absolute value T. In this case, it can be determined that the steering torque is set so as to increase over the acceptable variation width (=the set torque gradient limit absolute value T), and the steering output torque is set to be limited to the previous value +T (step 245). As described previously, the torque gradient limit absolute value T at the start and at the stop of the lane keep control is set smaller than that in continuation of the control. Namely, the absolute value T is set to be more limited or to be subjected to a more strict restriction. In other words, the allowable variation width is set smaller at the start and at the end of the control, so as to eliminate (or reduce) the driver's discomfort by virtue of the small variation width of steering reaction.

When step 240 results in answering no, it is then determined whether this deviation is smaller than −T (step 250). When step 250 results in answering yes, the deviation is smaller than −T which is the negative value corresponding to the set torque gradient limit absolute value T. In this case, it can be determined that the steering torque is set so as to decrease over the acceptable variation width (=the set torque gradient limit absolute value T), and thus the steering output torque is set to be limited to the previous value −T (step 255). At this point, similarly as in the case of the aforementioned case, the torque gradient limit absolute value T at the start and at the end of the lane keep control is set smaller than that in continuation of the control, and the acceptable variation width is set smaller at the start and at the end of the control, i.e., the variation width of steering reaction is reduced, so as to eliminate (or reduce) the driver's discomfort.

When step 250 results in answering no, the torque is within the permitted variation width (=the set torque gradient limit absolute value T) on both increase and decrease sides, and the target steering torque calculated at step 205 is thus set as an output torque as it is, without limitation (step 260). After the output torque is determined at one of steps 245, 255, and 260, the motor 15 is driven according to the determined output torque to steer the steered wheels FR, FL so as to prevent the vehicle 1 from departing from the lane.

In the present embodiment the motor 15 is an actuator for steering the steered wheels FR, FL. The CCD camera 8 functions as an image taking means. The image processor 9 and ECU function as a determining means. ECU 2 functions as a limiting means.

The driving support system of the present invention is by no means limited to the embodiment described above. For example, the above-described embodiment was arranged to determine the time change of the controlled variable of motor 15 (actuator) by use of the deviation between the previous value and the present value, but the determination may be made by use of a ratio thereof or the like. In a word, any parameter can be used as long as it permits the determination on the magnitude of the variation of steering reaction caused by driving of the motor 15. In the above-described embodiment, the controlled variable in determining the time change of the controlled variable of motor 15 (actuator) was determined based on the steering torque. However, the time change of the controlled variable of motor 15 (actuator) can also be determined based on any information content corresponding to the controlled variable of the actuator, e.g., the aforementioned target yaw rate or target lateral acceleration, or an electric energy supplied to motor 15, other than the steering torque.

What is claimed is:

1. A driving support system with an actuator for steering a steered wheel of a vehicle, which performs a driving support control for supporting driving of the vehicle by making use of steering by means of the actuator, the driving support system comprising:
   image taking means for taking a forward image ahead the vehicle;
   determining means for determining a controlled variable of the actuator on the basis of the forward image acquired by the image taking means;
   limiting means for limiting the controlled variable when a time change of the controlled variable of the actuator determined by the determining means is off a predetermined range; and
   controlling means for controlling the actuator,
   wherein the limiting means sets a limit value for limiting the time change of the controlled variable of the actuator so that the limit value at a start of the driving support control is different from the limit value in continuation of the driving support control.

2. The driving support system according to claim 1, wherein the limiting means sets the limit value so that an absolute value of the limit value at the start of the driving support control is smaller than an absolute value of the limit value in continuation of the driving support control.

3. The driving support system according to claim 2, wherein the limiting means sets the limit value so that the limit value at an end of the driving support control is also different from the limit value in continuation of the driving support control.

4. The driving support system according to claim 3, wherein the limiting means sets the limit value so that an absolute value of the limit value at the end of the driving support control is smaller than the absolute value of the limit value in continuation of the driving support control.

5. The driving support system according to claim 4, wherein the actuator is a motor for changing a steer angle of the steered wheel, the controlled variable of the actuator is an output torque of the motor, and the time change of the controlled variable is a torque gradient of the output torque.

6. The driving support system according to claim 5, wherein the image taking means is a camera, and
   wherein the determining means detects a driving lane from the forward image acquired by the camera, and determines the output torque of the motor so as to prevent the vehicle from departing from the driving lane on the basis of the detected driving lane.

7. The driving support system according to claim 6, further comprising a navigation system, wherein the determining means uses the navigation system together in detecting the driving lane.

8. A driving support system with an actuator for steering a steered wheel of a vehicle, which performs a driving support control for supporting driving of the vehicle by making use of steering by means of the actuator, the driving support system comprising:
   image taking means for taking a forward image ahead the vehicle;
   determining means for determining a controlled variable of the actuator on the basis of the forward image acquired by the image taking means;
   limiting means for limiting the controlled variable when a time change of the controlled variable of the actuator determined by the determining means is off a predetermined range; and
   controlling means for controlling the actuator,
   wherein the limiting means sets a limit value for limiting the time change of the controlled variable of the actuator so that the limit value at an end of the driving support control is different from the limit value in continuation of the driving support control.

9. The driving support system according to claim 8, wherein the limiting means sets the limit value so that an absolute value of the limit value at the end of the driving support control is smaller than an absolute value of the limit value in continuation of the driving support control.

10. The driving support system according to claim 9, wherein the actuator is a motor for changing a steer angle of the steered wheel, the controlled variable of the actuator is an output torque of the motor, and the time change of the controlled variable is a torque gradient of the output torque.

11. The driving support system according to claim 10, wherein the image taking means is a camera, and
    wherein the determining means detects a driving lane from the forward image acquired by the camera, and determines the output torque of the motor so as to prevent the vehicle from departing from the driving lane on the basis of the detected driving lane.

12. The driving support system according to claim 11, further comprising a navigation system, wherein the determining means uses the navigation system together in detecting the driving lane.

13. A driving support method for steering a steered wheel of a vehicle by means of an actuator, which performs a driving support control,
    wherein a forward image ahead the vehicle is taken;
    a controlled variable of the actuator is determined on the basis of the forward image acquired; and
    the actuator is controlled with a limitation of the controlled variable when a time change of the controlled variable of the actuator determined is off a predetermined range,
    wherein a limit value is set for limiting the time change of the controlled variable of the actuator so that the limit value at a start of the driving support control is different from the limit value in continuation of the driving support control.

14. The driving support method according to claim 13, wherein the limit value is set so that an absolute value of the limit value at the start of the driving support control is smaller than an absolute value of the limit value in continuation of the driving support control.

15. The driving support method according to claim 14, wherein the limit value is set so that the limit value at an end of the driving support control is also different from the limit value in continuation of the driving support control.

16. The driving support method according to claim 15, wherein the limit value is set so that an absolute value of the limit value at the end of the driving support control is smaller than the absolute value of the limit value in continuation of the driving support control.

17. The driving support method according to claim 16, wherein the actuator is a motor for changing a steer angle of the steered wheel, the controlled variable of the actuator is an output torque of the motor, and the time change of the controlled variable is a torque gradient of the output torque.

18. The driving support method according to claim 17, wherein the forward image is taken by means of a camera; and
    a driving lane is detected from the forward image acquired by the camera, and determines the output torque of the motor so as to prevent the vehicle from departing from the driving lane on the basis of the detected driving lane.

19. The driving support method according to claim 18, wherein a navigation system is used together in detecting the driving lane.

20. A driving support method for steering a steered wheel of a vehicle by means of an actuator, which performs a driving support control,
    wherein a forward image ahead the vehicle is taken;
    a controlled variable of the actuator is determined on the basis of the forward image acquired; and
    the actuator is controlled with a limitation of the controlled variable when a time change of the controlled variable of the actuator determined is off a predetermined range,
    wherein a limit value is set for limiting the time change of the controlled variable of the actuator so that the limit value at an end of the driving support control is different from the limit value in continuation of the driving support control.

21. The driving support method according to claim 20, wherein the limit value is set so that an absolute value of the limit value at the end of the driving support control is smaller than an absolute value of the limit value in continuation of the driving support control.

22. The driving support method according to claim 21, wherein the actuator is a motor for changing a steer angle of the steered wheel, the controlled variable of the actuator is an output torque of the motor, and the time change of the controlled variable is a torque gradient of the output torque.

23. The driving support method according to claim 22, wherein the forward image is taken by means of a camera; and
    a driving lane is detected from the forward image acquired by the camera, and determines the output torque of the motor so as to prevent the vehicle from departing from the driving lane on the basis of the detected driving lane.

24. The driving support method according to claim 23, wherein a navigation system is used together in detecting the driving lane.

* * * * *